United States Patent
Kumar et al.

(10) Patent No.: US 12,438,898 B2
(45) Date of Patent: Oct. 7, 2025

(54) METHOD, APPARATUS, SYSTEM, AND NON-TRANSITORY COMPUTER READABLE MEDIUM FOR DETECTING ANOMALOUS USER ACCESS BEHAVIORS

(71) Applicant: Charles Schwab & Co., Inc, San Francisco, CA (US)

(72) Inventors: Rajneesh Kumar, Detroit, MI (US); William Walker, Denver, CO (US); Bashar Abouseido, Phoenix, AZ (US)

(73) Assignee: Charles Schwab & Co., Inc, San Francisco, CA (US)

( * ) Notice: Subject to any disclaimer, the term of this patent is extended or adjusted under 35 U.S.C. 154(b) by 212 days.

(21) Appl. No.: 18/304,245

(22) Filed: Apr. 20, 2023

(65) Prior Publication Data

US 2024/0356945 A1 Oct. 24, 2024

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/20* (2013.01)

(58) Field of Classification Search
CPC . H04L 63/1425; H04L 63/20; H04L 63/1408; H04L 63/1416; H04L 9/40; G06N 20/00; G06N 3/045; G06N 3/08; G06N 3/088; G06N 20/20; G06F 21/552
See application file for complete search history.

(56) References Cited

U.S. PATENT DOCUMENTS

| | | | |
|---|---|---|---|
| 10,341,391 B1 | 7/2019 | Pandey et al. | |
| 10,878,102 B2 | 12/2020 | Manadhata et al. | |
| 11,582,240 B1* | 2/2023 | Bhatt | G06F 21/6245 |
| 11,966,930 B1* | 4/2024 | Posert | G06N 3/09 |
| 2006/0020814 A1* | 1/2006 | Lieblich | G06F 21/577 |
| | | | 713/182 |
| 2017/0063887 A1 | 3/2017 | Muddu et al. | |

(Continued)

OTHER PUBLICATIONS

International Search Report and Written Opinion from corresponding PCT Application No. PCT/US2024/020203 dated May 24, 2024.

(Continued)

*Primary Examiner* — Quazi Farooqui
(74) *Attorney, Agent, or Firm* — Harness, Dickey & Pierce, P.L.C.

(57) ABSTRACT

A server for detecting anomalies associated with users accessing a network is caused to receive a dataset including static data and dynamic data. The static data includes location data of resources associated with the network and user data, and the dynamic data includes user access events. The server is further caused to detect, with a plurality of unsupervised machine learning models, an anomaly associated with a user accessing the network based on the static data and the dynamic data, determine whether the detected anomaly is critical, and in response to determining the detected anomaly is critical, generate and transmit a security alert specific to the detected anomaly to a security operation center. Other example servers, systems, apparatuses, methods, and non-transitory computer readable medium for detecting anomalies associated with users accessing a network are also disclosed.

20 Claims, 6 Drawing Sheets

(56) References Cited

U.S. PATENT DOCUMENTS

2021/0126938 A1    4/2021    Trost et al.
2023/0244775 A1*    8/2023    Alexander ............ G06F 21/316
                                                                         726/18
2024/0338628 A1*  10/2024    Ji ....................... G06Q 10/0635

OTHER PUBLICATIONS

Jim Apger et al., "Say Goodbye to Your Big Alert Pipeline, and Say Hello to Your New Risk-Based Approach" Conf18, Splunk inc., Oct. 2018.
"Implementing risk-based alerting" splunk, pp. 1-7, downloaded Apr. 20, 2023<https://lantern.splunk.com/Security/Product_Tips/Enterprise_Security/Implementing_risk-based_alerting>.
Billy Huang et al., "Taking Back Control of your SOC with Risk Based Alerting" Guidepoint security, downloaded Apr. 20, 2023 https://www.guidepointsecurity.com/blog/taking-back-control-of-your-soc-with-risk-based-alerting/.

* cited by examiner

METHOD, APPARATUS, SYSTEM, AND NON-TRANSITORY COMPUTER READABLE MEDIUM FOR DETECTING ANOMALOUS USER ACCESS BEHAVIORS

BACKGROUND

Field

Various example embodiments relate to methods, apparatuses, systems, and/or non-transitory computer readable media for detecting anomalous user access behaviors, and more particularly, to methods, apparatuses, systems, and/or non-transitory computer readable media for detecting anomalous user access behaviors through multiple machine learning models.

Description of the Related Art

Companies often have workplace flexibility allowing employees to work from remote locations using computing devices of their choice. With such flexibility, security threats to computing networks of the companies have increased considerably. Conventionally, rule-based solutions are employed to identify security threats and provide alerts to a security operation center (SOC) of the threats. Security analysts then investigate each security threat individually to determine the severity of the security threat and necessary steps to take to mitigate damage caused by the security threat. In some cases, it may not always be clear at the outset what behaviors or security events could be a precursor to a serious breach in a company's security. By the time such attacks become known to the SOC, considerable damage to the company (e.g., financial damage, reputational damage, etc.) may already be done. As such, security threats are preferable identified and mitigated as early as possible.

The alerts generated by conventional rule-based solutions are based on narrowly predefined rules. As such, the rule-based solutions can detect violations to existing rules but not something novel that has hitherto been unseen. Since the cybersecurity landscape is continually evolving as new threats emerge, many of the today's rules may become ineffective in the future or can give rise to false alerts. Additionally, the conventional rule-based solutions are reactive solutions with respect to stopping threats. This is due to the predefined rules being hand-crafted based on well-known or intuitive security scenarios.

SUMMARY

At least one example embodiment is directed towards a server for detecting anomalies associated with users accessing a network.

In at least one example embodiment, the server may include a memory storing computer readable instructions, and processing circuitry configured to execute the computer readable instructions to cause the server to, receive a dataset including static data and dynamic data, the static data including location data of resources associated with the network and user data, the dynamic data including user access events, detect, with a plurality of unsupervised machine learning (ML) models, an anomaly associated with a user accessing the network based on the static data and the dynamic data, determine whether the detected anomaly is critical, and in response to determining the detected anomaly is critical, generate and transmit a security alert specific to the detected anomaly to a security operation center (SOC).

Some example embodiments provide that the server is further caused to classify the detected anomaly as a false positive based on one or more defined rules.

Some example embodiments provide that the server is further caused to increase a risk score specific to the user in response to determining the detected anomaly is not critical.

Some example embodiments provide that the server is further caused to determine whether the risk score exceeds a defined threshold, and in response to the risk score exceeding the defined threshold, generate and transmit a security alert specific to the user to the SOC.

Some example embodiments provide that the server is further caused to receive feedback from the SOC specific to the detected anomaly, and modify at least one of the one or more defined rules based on the received feedback.

Some example embodiments provide that the server is further caused to receive feedback from the SOC specific to the detected anomaly, and tune the plurality of unsupervised ML models based on the received feedback.

Some example embodiments provide the plurality of unsupervised ML models are trained unsupervised ML models, and the server is further caused to detect whether performance of the plurality of unsupervised ML models falls below a defined threshold, and retrain the plurality of unsupervised ML models in response to the performance of the plurality of unsupervised ML models falling below the defined threshold.

Some example embodiments provide that the server is further caused to receive feedback from the SOC specific to the detected anomaly, train a plurality of supervised ML models based on the received feedback, and detect, with the plurality of supervised ML models, an anomaly associated with a user accessing the network based on the static data and the dynamic data.

Some example embodiments provide the user access events includes at least one of a virtual private network login, a physical badge swipe, and a multifactor authentication process.

At least one example embodiment is directed towards a method for detecting anomalies associated with users accessing a network.

In at least one example embodiment, the method may include receiving a dataset including static data and dynamic data, the static data including location data of resources associated with the network and user data, the dynamic data including user access events, detecting, with a plurality of unsupervised machine learning (ML) models, an anomaly associated with a user accessing the network based on the static data and the dynamic data, determining whether the detected anomaly is critical, and in response to determining the detected anomaly is critical, generating and transmitting a security alert specific to the detected anomaly to a security operation center (SOC).

Some example embodiments provide that the method further includes classifying the detected anomaly as a false positive based on one or more defined rules.

Some example embodiments provide that the method further includes increasing a risk score specific to the user in response to determining the detected anomaly is not critical.

Some example embodiments provide that the method further includes determining whether the risk score exceeds a defined threshold, and in response to the risk score exceeding the defined threshold, generating and transmitting a security alert specific to the user to the SOC.

Some example embodiments provide that the method further includes receiving feedback from the SOC specific to the detected anomaly, and modifying at least one of the one or more defined rules based on the received feedback.

Some example embodiments provide that the method further includes receiving feedback from the SOC specific to the detected anomaly; and tuning the plurality of unsupervised ML models based on the received feedback.

Some example embodiments provide that the plurality of unsupervised ML models are trained unsupervised ML models, and the method further includes detecting whether performance of the plurality of unsupervised ML models falls below a defined threshold, and retraining the plurality of unsupervised ML models in response to the performance of the plurality of unsupervised ML models falling below the defined threshold.

Some example embodiments provide that the method further includes receiving feedback from the SOC specific to the detected anomaly, training a plurality of supervised ML models based on the received feedback, and detecting, with the plurality of supervised ML models, an anomaly associated with a user accessing the network based on the static data and the dynamic data.

At least one example embodiment is directed to a non-transitory computer readable medium.

In at least one example embodiment, the non-transitory computer readable medium stores computer readable instructions, which when executed by processing circuitry of a server, causes the server to, receive a dataset including static data and dynamic data, the static data including location data of resources associated with a network and user data, the dynamic data including user login events, detect, with a plurality of unsupervised machine learning (ML) models, an anomaly associated with a user accessing the network based on the static data and the dynamic data, determine whether the detected anomaly is critical, and in response to determining the detected anomaly is critical, generate and transmit a security alert to a security operation center (SOC) specific to the detected anomaly.

Some example embodiments provide that the plurality of unsupervised ML models are trained unsupervised ML models, and the server is further caused to detect whether performance of the plurality of unsupervised ML models falls below a defined threshold, and retrain the plurality of unsupervised ML models in response to the performance of the plurality of unsupervised ML models falling below the defined threshold.

Some example embodiments provide that the server is further caused to receive feedback from the SOC specific to the detected anomaly, train a plurality of supervised ML models based on the received feedback, and detect, with the plurality of supervised ML models, an anomaly associated with a user accessing the network based on the static data and the dynamic data.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
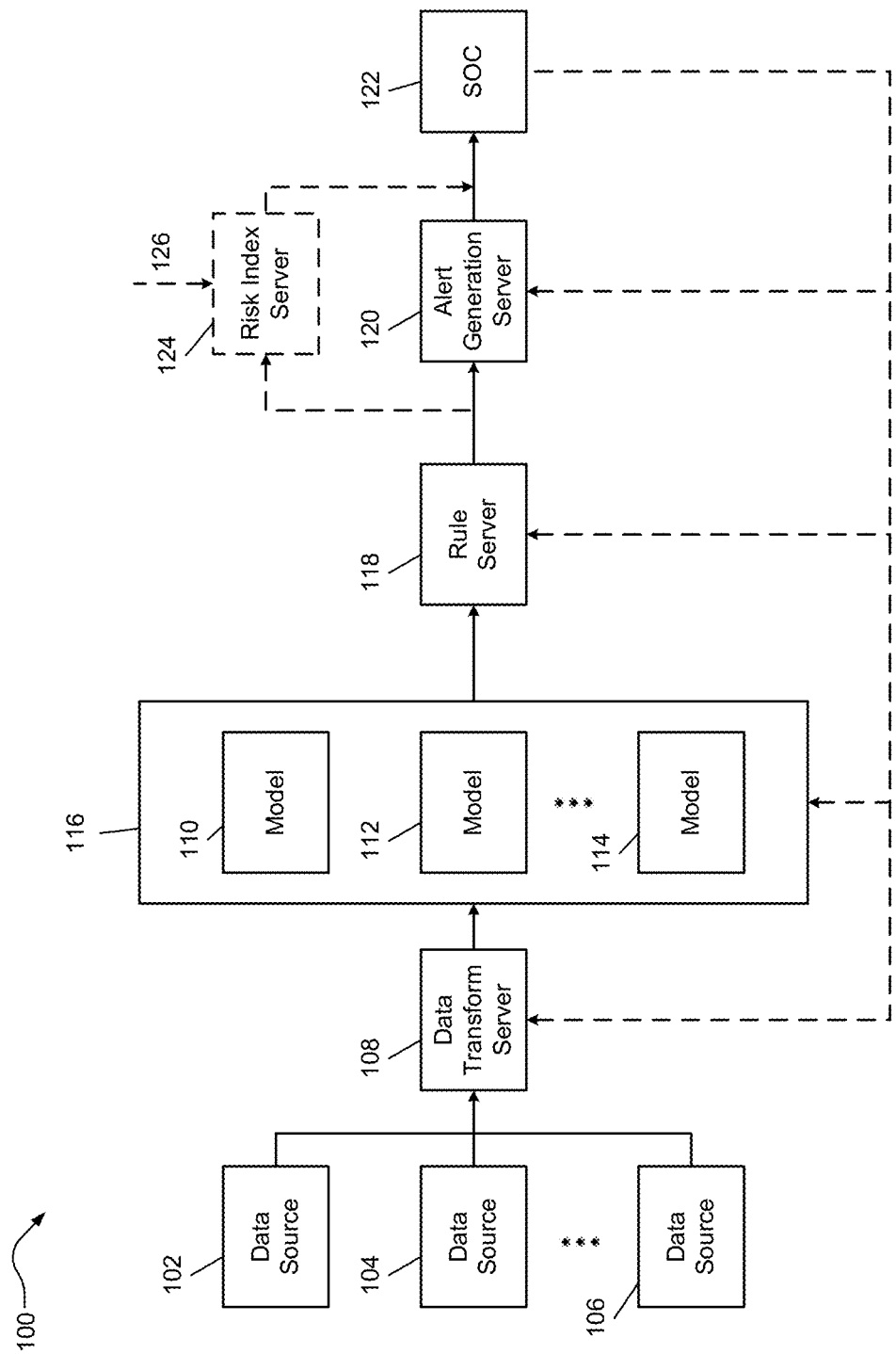
FIG. 1 illustrates a system associated with detecting anomalies associated with users accessing a computing network according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory (ies) that work together to cause an apparatus, such as a mobile phone, a smart device, and/or server, etc., to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to methods, systems, devices, and/or non-transitory computer readable media for providing a machine learning based framework for detecting anomalous user access behaviors by leveraging multiple machine learning (ML) models that flag unusual activities and/or impossible scenarios related to users (e.g., employees, etc.) using remote (e.g., virtual private network (VPN), etc.) access and physical badge access of a computing network and/or resources associated with the computing network. Any detected inconsistencies between the physical and virtual presence of users may be signs of compromised accounts and/or internal threats. As such, a security operation center (SOC) may be notified of the inconsistencies as soon as possible. For example, the anomalies predicted by the ML models may be deemed time-sensitive and critical, and therefore trigger automatic remediation measures by the SOC. In other examples, the anomalies predicted by the ML models may be deemed non-critical. Such non-critical anomalies may still add a score to the user's risk score and when the user's risk score crosses a preset threshold, SOC may be alerted with a security event.

Through machine learning, the models may be trained and tuned according to what the normal patterns around remote and physical access look like. For example, performance of the models may be improved continuously through investigation results of the SOC and feedback from SOC analysts. The trained models may then identify anomalous or unusual user access behaviors and patterns, and report such behaviors and patterns to the SOC. In this manner, the machine learning based framework may preemptively recognize and cause investigation of behaviors and patterns that represent a considerable departure from the norm, thereby allowing possible attacks to be stopped or at least contained. As a result, the security posture against internal and external threats is enhanced and the computing network is more secure as compared to traditional systems relying on, for example, rule-based solutions. To further enhance security of the computing network, the machine learning based framework herein may be optionally implemented to supplement traditional rule-based solutions.

Given the global nature of the workforce of many companies (e.g., full-time remote/in office employees, remote/in office contractors, etc. throughout the world), the machine learning based framework herein adds a layer of security against internal and external threats. Anomalies or unusual patterns in the observed behaviors may be the first indicator in many cases of a hack or emerging security threat that can snowball into financial and reputational consequences for the companies if left undetected. The machine learning based framework allows the flagging such incidents for investigation early enough so that remediation measures, such as account lockout of the suspected user, can be applied and damage can be minimized.

According to at least one example embodiment, the machine learning based framework may receive a dataset including static data and dynamic data. In such examples, the static data may include location data of resources associated with the computing network and user data, and the dynamic data may include user access events (e.g., VPN logins, physical badge swipes, multifactor authentication processes, etc.). Then, according to at least one example embodiment, the risk based intelligent monitoring framework may detect an anomaly associated with a user accessing the computing network based on the static data and the dynamic data. In such examples, the anomaly is detected with multiple unsupervised ML models, which may be trained and tuned according to SOC feedback and/or retrained if model performance falls below a threshold due to, for example, shifts in behaviors of baseline user access events. In at least one example embodiment, supervised ML models may be trained according to SOC feedback and then used to detect detects an anomaly associated with a user accessing the computing network based on the static data and the dynamic data. As such, the unsupervised ML models may be replaced and/or supplemented with supervised ML models if desired.

The machine learning based framework may then determine whether the detected anomaly is critical, according to at least one example embodiment. For example, the detected anomaly may be provided an anomaly score by the ML model which identified the anomaly. If the anomaly score exceeds a threshold or the leading cause of the anomaly is of a certain type, the detected anomaly may be deemed critical. Otherwise, if the detected anomaly has a sufficiently low anomaly score, the detected anomaly may be deemed non-critical. In other examples, one or more defined rules (e.g., business rules, etc.) may be applied to the detected anomaly. If the detected anomaly is deemed to be a false positive based on the defined rules, the anomaly may be filtered (e.g., prevented from passing). The machine learning based framework may then account for the detected and unfiltered anomaly and other detected and unfiltered anomalies specific to the user through a risk score for that user. For example, for each critical and/or non-critical anomaly, the machine learning based framework may generate a risk score, increase an existing risk score, etc. for the user. Then, according to at least one example embodiment, the machine learning based framework may generate and transmit a security alert to the SOC in response to determining the detected anomaly is critical, the risk score for the user is sufficiently high, etc. In this manner, the machine learning based framework leverages ML models to detect anomalous or unusual user access behaviors and patterns, and then may report such behaviors and patterns to the SOC, thereby allowing the SOC and analysts associated therewith to take remedial and/or preventive actions to stop or contain possible attacks.

FIG. 1 illustrates a system 100 associated with a machine learning based framework according to at least one example embodiment. The machine learning based framework may detect anomalies associated with users accessing a computing network, either virtually (e.g., via VPNs, etc.) or physically (e.g., via physical badge swipes). The machine learning based framework of FIG. 1 may be implemented on site, in a cloud (e.g., a public cloud, etc.), or a hybrid of the two.

As shown in FIG. 1, the system 100 generally includes a data transform server 108, a ML server 116, an optional rule server 118, an alert generation server 120, and an optional risk index server 124. In the example of FIG. 1, the ML server 116 includes an ensemble of ML models 110, 112, 114. While the system 100 of FIG. 1 is shown as including three ML models 110, 112, 114, it should be appreciated that the system 100 may include more or less ML models if desired. Additionally, according to some example embodiments, the data transform server 108, the ML server 116, the rule server 118, the alert generation server 120, and/or the risk index server 124 may be implemented as a single server, or one or more of the data transform server 108, the ML server 116, the rule server 118, the alert generation server 120 and/or the risk index server 124 may be implemented as a plurality of servers, etc.

According to some example embodiments, the data transform server 108 receives one or more datasets from various data sources 102, 104, 106. The datasets may be provided in a batch mode (e.g., a set of collected data over time is sent periodically) or a streaming mode (e.g., collected data is transmitted and fed continuously in real-time). In various embodiments, the datasets may each have static data and dynamic data. The static data may include, for example, location data of resources associated with a computing network and user data. More specifically, the static data may include information about company assets (e.g., building data, network device data, etc.), employee data (e.g., from databases, etc.), office building locations, geolocations of users accessing VPNs based on internet protocol (IP) addresses, etc. Dynamic data may include, for example, user access events and logs, such as VPN logins, physical badge swipes, multifactor authentication processes, etc. Compared to dynamic data that could be fetched in near real-time or every few minutes (if desired), static data may be updated less frequently, e.g., daily or every few days.

In various embodiments, the data transform server 108 may perform data preprocessing to prepare the received data (e.g., raw data) to enable feature engineering. For instance, some or all of the raw data from the data sources 102, 104, 106 may be in unusable and/or undesirable formats. In such examples, the data transform server 108 may normalize (e.g., translate or transform) the raw data having unusable and/or undesirable formats into a standardized format, and then aggregate the normalized data (and any raw data already in a useable and/or desirable format).

As shown in FIG. 1, the possible mixture of original, raw data and engineered features is then sent to the ML server 116 via a batch or a data stream as explained above. More specifically, the data is provided to the input of each ML model 110, 112, 114, which may be initially drawn from an unsupervised ML family of models. For example, any one of the ML models 110, 112, 114 may include any suitable type of unsupervised model, such as an isolation forest model, one-class support vector machine (SVM) model, and autoencoder model.

In various embodiments, the unsupervised models 110, 112, 114 may be trained individually. In such examples, each model 110, 112, 114 may be trained according to normal access patterns (e.g., virtual access patterns and physical access patterns) associated with users accessing the computing network and received feedback from, for example, SOC analysts. Once each unsupervised model 110, 112, 114 is sufficiently trained, they may form an ensemble of models that is better, as measured by performance metrics, than any of the individual models 110, 112, 114. In various embodiments, any one of the unsupervised models 110, 112, 114 may be sufficiently trained when one or more of its performance metrics (e.g., accuracy, precision, recall, f1-score, etc.) on test data is about 10% or less, 5% or less, etc.

The trained, unsupervised models 110, 112, 114 may detect anomalies associated with users accessing the network based on the static data and the dynamic data in the data stream. For example, the models 110, 112, 114 may detect anomalous events or patterns (e.g., collectively, outlier activities) in how the user access and/or uses various channels to login to the computing network. Nonlimiting examples of such outlier activities may include the same user logging into the computing network concurrently from two different geolocations that are far apart, a deactivated user logging into the computing network, a user traveling at a physically impossible high speed, etc.

In various embodiments, each detected anomaly may have an anomaly value (e.g., a score) assigned to it. In such examples, the value (e.g., a normalized value between 0 and 1, 0 and 100, etc.) of one detected anomaly may indicate how anomalous that anomaly is relative to other anomalies. The anomaly value may be determined by any suitable method, such as a conventional isolation forest algorithm, SVM algorithm, autoencoder algorithm, etc.

As shown in FIG. 1, the rule server 118 is in communication with the ML server 116 for receiving the detected anomalies and their corresponding anomaly values from the models 110, 112, 114. Such anomalies may be served to the rule server 118 (and/or further downstream to, for example, the alert generation server 120, the SOC 122, etc.) in a batch or streaming mode. In such examples, the rule server 118 may function as a filtering component to filter out false positives and/or anomalies of low value. For example, if a detected anomaly is considered a false positive, the anomaly may be filtered thereby preventing the anomaly from passing through the rule server 118. If the detected anomaly has a low value (as further explained below), the rule server 118 may filter the anomaly to prevent it from passing therethrough or classify the anomaly as non-critical.

For example, the rule server 118 may apply one or more defined rules (e.g., business rules, etc.) to each received anomaly to take into account real world considerations. If any of the rules apply to a particular anomaly, that anomaly may be considered a false positive. For instance, the rules may relate to badge access attempts at two different locations during a period of time while the user is traveling (e.g., flying, driving, etc.), VPN login attempts at two different geolocations during a period of time while the user is traveling (e.g., flying, driving, etc.), etc. In such examples, the multiple badge access attempts and VPN login attempts at different locations is explainable due to, for example, the user traveling (e.g., moving from one location to another location) within normal speed limits of the mode of travel. If a condition in the rule applies, the rule server 118 may deem the anomaly as a false positive and filter out the anomaly. Further, in some examples, the rule server 118 may filter out a detected anomaly if its anomaly value is below a defined threshold, which may be set and/or adjusted based on, for example, a desired volume of alerts for investigation, etc. In various embodiments, the defined threshold may be a desired percent of a maximum normalized value, a desired value (e.g., an average anomaly value over a period of time, etc.), etc.

In various embodiments, the system 100 may determine whether any of the detected anomalies are critical. For example, if a detected anomaly passes through the rule server 118 (e.g., is not filtered out), the anomaly may be classified as critical. In other examples, the alert generation server 120 may receive the detected anomaly from the rule server 118 and determine whether the detected anomaly is critical or non-critical based on its anomaly value and the nature of anomaly itself. In such examples, the anomalies may be deemed critical if their values exceed a defined threshold, and/or non-critical if their values are fall below the same or a different defined threshold. The defined threshold(s) for determining whether the detected anomaly is critical and/or non-critical may be set and/or adjusted based on, for example, a desired volume of alerts for investigation, etc. In such examples, the defined threshold(s) may be a desired percent of a maximum normalized value, a desired value (e.g., an average anomaly value over a period of time, etc.), etc.

Then, the system 100 may, in response to determining a detected anomaly is critical, generate and transmit a security alert to the SOC 122 specific to the detected anomaly. For example, the alert generation server 120 may generate and transmit a security alert specific to the detected anomaly and/or the user who is associated with the anomaly. In such examples, the alert generation server 120 may include information in the security alert about the detected anomaly and about the user (e.g., remote worker, office location, traveling, etc.).

Once received by the SOC 122, the security alert may be investigated. For example, security analysts and/or other resources associated with the SOC 122 may investigate the security alert. In such examples, if the security alert is found to be applicable, the SOC 122 may take remedial and/or preventive actions to stop or contain possible attacks. In other examples, the security alert may trigger an immediate remediation effort, thereby bypassing investigation by the security analysts.

In various embodiments, the system 100 may generate, influence, etc. a risk score associated with a user. For example, while frequently occurring low value anomalies for user login behavior may not amount to much individually, the low value anomalies (when considered collectively) may add to the user's risk score over time before it bubbles up to surface where SOC investigation may ensue. As such, the risk index server 124 may generate a risk score for a user based on a detected anomaly. In some examples, the risk index server 124 may generate a risk score and/or influence (e.g., increase) a previously generated risk score in response to a detected anomaly being non-critical or critical. For instance, the risk index server 124 may receive the non-critical and/or critical anomalies and specific users associated with the anomalies from the rule server 118 as shown in FIG. 1 and/or from the alert generation server 120. In such examples, the anomalies may provide contextual information within a framework that monitors user activities over time before flagging a user whose overall risk score crosses a threshold. In response to receiving the detected anomaly, the risk index server 124 may increase a risk score specific to that user.

In some embodiments, the risk index server 124 may take in account other information when updating a user's risk score. For example, and as shown in FIG. 1, the risk index server 124 may receive one or more signals 126 indicative of possible security events associated with the computing network. The security events may include, for example, a user receiving a phishing email, a user visiting a website having an unknown security classification, multiple user login failures within a defined period of time from multiple IP addresses, a user login from a new IP address, a user login from an IP address outside the country of residence, etc. In such examples, each security event may be scored, for example, by a set of algorithms (e.g., rule-based conditions and scoring instructions) and/or another suitable scoring mechanism, such as a defined formula. The defined formula may include various factors, such as a potential impact of the event, a confidence level of the event, a risk modifier, etc. Such factors may provide a dynamic scoring mechanism for the security event.

Then, the risk index server 124 may generate and transmit a security alert specific to the user to the SOC 122 if a total risk score (e.g., an aggregation of individual risk scores) exceeds a defined threshold. In such examples, the security alert may include information about the detected anomalies, the security events, etc. leading to the generated alert. In this manner, the SOC 122 and resources thereof are provided a more holistic view of the alert.

In various embodiments, once investigation results are available for one or more security alerts, the SOC 122 may provide optional feedback to tweak and improve the upstream processes for better model predictions in a recurrent manner. In such examples, the feedback may be provided by security analysts and/or other resources associated with the SOC 122.

For example, and as shown in FIG. 1, the SOC 122 may provide feedback specific to the detected anomalies to the data transform server 108, the ML server 116, the rule server 118, and/or the alert generation server 120. In such examples, variables associated with the data transform server 108 may be modified to adjust processing of the static and dynamic data. Additionally, the models 110, 112, 114 may be tuned, trained, etc. based on the received feedback. For instance, hyperparameters of the models 110, 112, 114, model families (e.g., in an ensemble), individual model weights in the ensemble, etc. may be modified based on the feedback to improve performance metrics. Further, with respect to the rule server 118, one or more of the defined rules may be modified, new rules may be created, and/or anomaly value thresholds (for filtering out low value anomalies) may be modified based on the feedback. Also, in some examples, the anomaly value thresholds associated with the alert generation server 120 may be modified based on the feedback if desired.

In some embodiments, the models 110, 112, 114 (and/or other models herein) may be retrained. For example, the ML server 116 and/or the SOC 122 may detect whether performance of the ML models 110, 112, 114 falls below a defined threshold. Then, in response to the performance falling below the defined threshold, the models 110, 112, 114 may be retrained based on, for example, new normal patterns relating to remote and/or physical access. For instance, a trigger, either manual or automated, can start the retraining process of the models 110, 112, 114 once model performance drops, due to any of the myriad of reasons, below the threshold. Such model performance may be automatically detected, and therefore may eliminate any manual effort in keeping the models 110, 112, 114 updated.

Additionally, any shift in the baseline login behavior may be automatically accounted for through model retraining. For example, because the models 110, 112, 114 may be unsupervised in nature, unlike a conventional rule-based solution, they do not overlook any unusual pattern or behavior for which a rule does not exist. This allows the models 110, 112, 114 to keep up with new and emerging threats by spotting such risks preemptively.

In various embodiments, supervised ML models may be employed to supplement and/or replace unsupervised ML models, such as the unsupervised models 110, 112, 114 in the system 100 of FIG. 1. For example, the system 100 may train one or more supervised ML models based on received feedback from the SOC 122. In such examples, security analysts and/or other resources associated with the SOC 122 may label data (e.g., received static data and dynamic data) for the supervised ML models. Once trained, the supervised ML models may be compared to the unsupervised models 110, 112, 114. If performance of the supervised ML models is better than the unsupervised models 110, 112, 114, the supervised ML models may be employed (instead of or along with the unsupervised models 110, 112, 114) for detecting an anomaly associated with a user accessing the computing network as explained herein.

The ML models herein may have any suitable model architecture. For instance, any one of the unsupervised models 110, 112, 114, the supervised ML models, etc. may employ classical ML algorithms (e.g., linear regression, logistic regression, decision tree, SVM, etc.), deep learning algorithms based on neutral networks.

While certain components of a system associated with a machine learning based framework are shown in FIG. 1, the example embodiments are not limited thereto, and the system may include components other than that shown in FIG. 1, which are desired, necessary, and/or beneficial for operation of the system.

Figure 2:
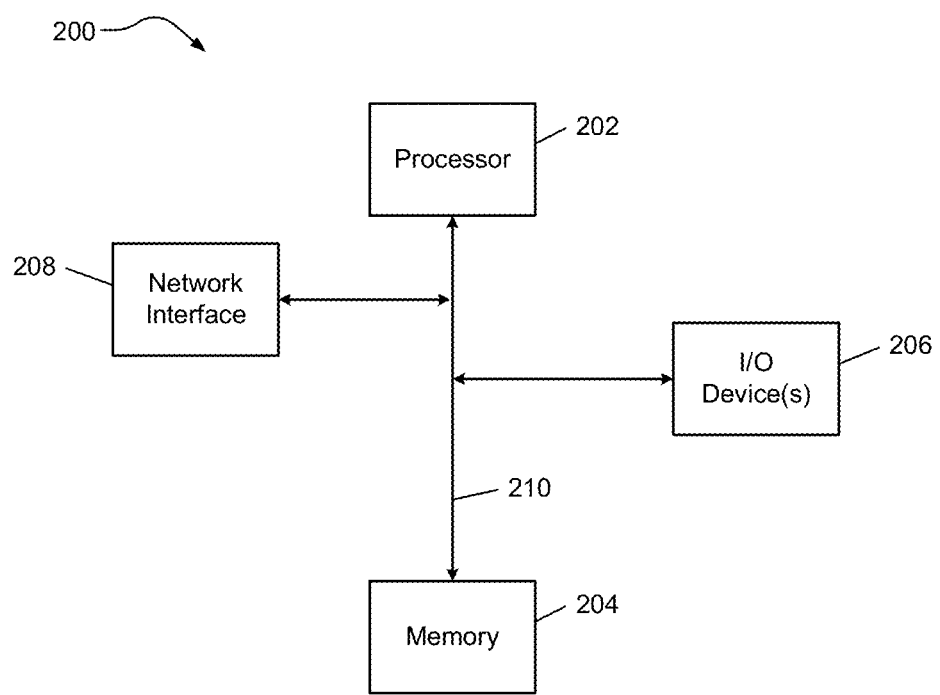
FIG. 2 illustrates a block diagram of an example computing device of the system of FIG. 1 according to at least one example embodiment.

FIG. 2 illustrates a block diagram of an example computing device 200 of the machine learning based framework according to at least one example embodiment. The computing device 200 of FIG. 2 may correspond to the data transform server 108, the ML server 116, the rule server 118, the alert generation server 120, and/or the risk index server 124 of FIG. 1, but the example embodiments are not limited thereto.

As shown in FIG. 2, the computing device 200 may include processing circuitry (e.g., at least one processor 202), at least one communication bus 210, memory 204, at least one network interface 208, and/or at least one input/output (I/O) device 206 (e.g., a keyboard, a touchscreen, a mouse, a microphone, a camera, a speaker, etc.), etc., but the example embodiments are not limited thereto. In the example of FIG. 2, the memory 204 may include various special purpose program code including computer executable instructions which may cause the computing device 200 to perform the one or more of the methods of the example embodiments, including but not limited to computer executable instructions related to the machine learning based framework explained herein.

In at least one example embodiment, the processing circuitry may include at least one processor (and/or processor cores, distributed processors, networked processors, etc.), such as the processor 202, which may be configured to control one or more elements of the computing device 200, and thereby cause the computing device 200 to perform various operations. The processing circuitry (e.g., the processor 202, etc.) is configured to execute processes by retrieving program code (e.g., computer readable instructions) and data from the memory 204 to process them, thereby executing special purpose control and functions of the entire computing device 200. Once the special purpose program instructions are loaded (e.g., into the processor 202, etc.), the processor 202 executes the special purpose program instructions, thereby transforming the processor 202 into a special purpose processor.

In at least one example embodiment, the memory 204 may be a non-transitory computer-readable storage medium and may include a random access memory (RAM), a read only memory (ROM), and/or a permanent mass storage device such as a disk drive, or a solid state drive. Stored in the memory 204 is program code (i.e., computer readable instructions) related to operating the machine learning based framework as explained herein, such as the methods discussed in connection with FIGS. 3-6, the network interface 208, and/or the I/O device 206, etc. Such software elements may be loaded from a non-transitory computer-readable storage medium independent of the memory 204, using a drive mechanism (not shown) connected to the computing device 200, or via the network interface 208, and/or the I/O device 206, etc.

In at least one example embodiment, the at least one communication bus 210 may enable communication and/or data transmission to be performed between elements of the computing device 200. The bus 210 may be implemented using a high-speed serial bus, a parallel bus, and/or any other appropriate communication technology. According to some example embodiments, the computing device 200 may include a plurality of communication buses (not shown).

While FIG. 2 depicts an example embodiment of the computing device 200, the computing device 200 is not limited thereto, and may include additional and/or alternative architectures that may be suitable for the purposes demonstrated. For example, the functionality of the computing device 200 may be divided among a plurality of physical, logical, and/or virtual servers and/or computing devices, network elements, etc., but the example embodiments are not limited thereto.

Figure 3:
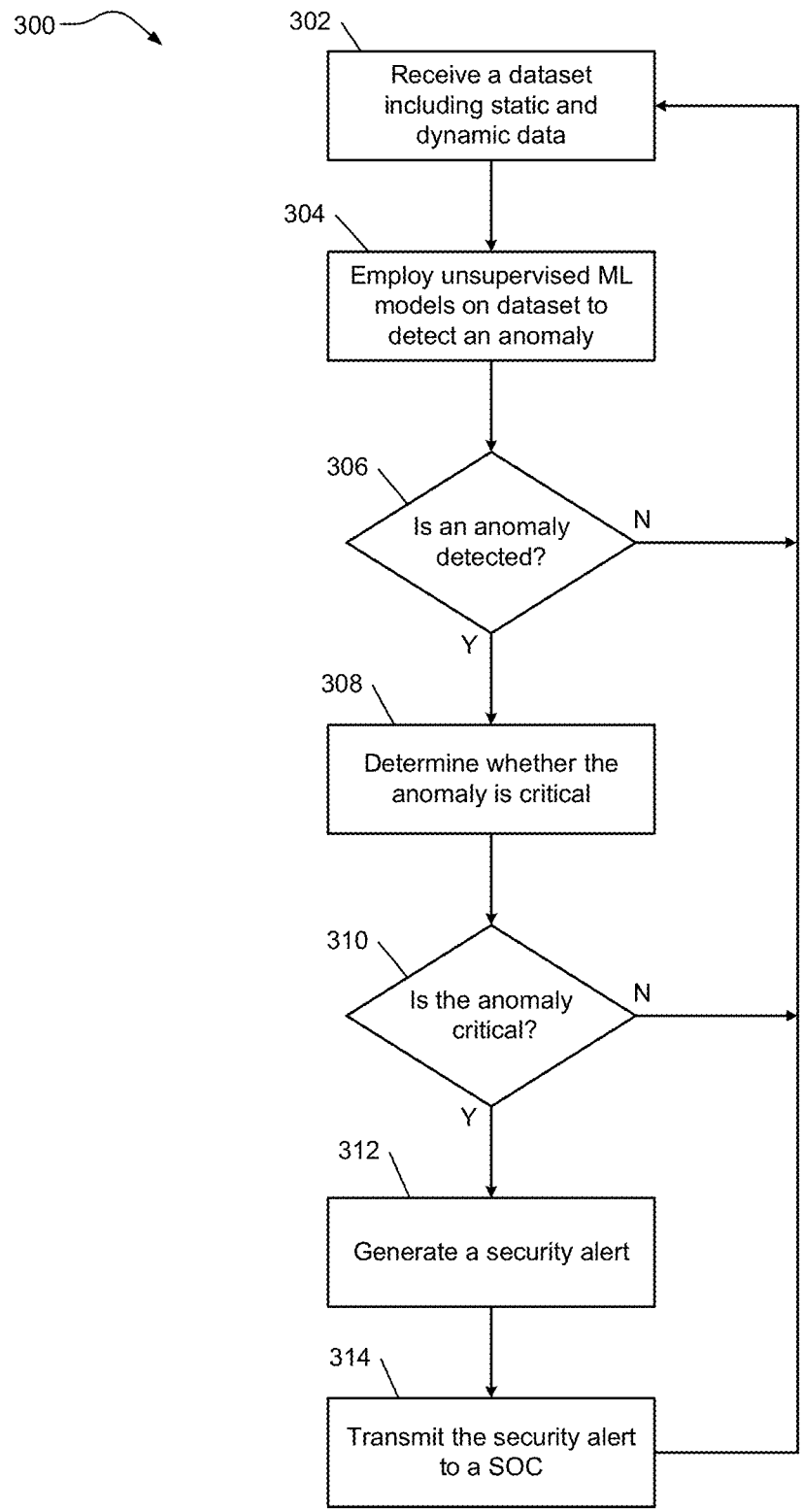
FIG. 3 illustrates an example anomaly detection method associated with users accessing a computing network according to at least one example embodiment.

FIG. 3 illustrates an example anomaly detection method 300 associated with users accessing a computing network according to at least one example embodiment. As shown, the method 300 begins in operation 302 where a server, such as the data transform server 108 or the ML server 116 of FIG. 1, may receive and/or obtain one or more datasets including static and dynamic data from various data sources, as explained herein. Then, in operation 304 multiple unsupervised ML models (e.g., the ML models 110, 112, 114 of FIG. 1) may be employed to detect anomalies associated with the received static and dynamic data. If no anomalies are detected in operation 306, the method 300 may return to operation 302. If, however, an anomaly is detected in operation 306, the method 300 proceeds to operation 308.

In operation 308, a server, such as the rule server 118 and/or the alert generation server 120 of FIG. 1, may determine whether the detected anomaly is critical. For example, and as explained herein, the detected anomaly may be considered critical if it is not filtered out by the rule server 118, if the alert generation server 120 determines the detected anomaly has an anomaly value greater than a defined threshold, the leading cause of the anomaly is of a certain type, etc. If the detected anomaly is determined to be not critical (e.g., is non-critical) in operation 310, the method 300 may return to operation 302. If, however, the detected anomaly is determined to be critical in operation 310, the method 300 proceeds to operation 312.

In operation 312, the alert generation server 120 may generate a security alert. For example, the alert generation server 120 may generate a security alert specific to the detected anomaly and/or the user who is associated with the anomaly. In such examples, the alert generation server 120 may include information in the security alert about the detected anomaly and about the user (e.g., remote worker, office location, traveling, etc.). Then, in operation 314, the alert generation server 120 may transmit the security alert to a SOC (e.g., the SOC 122 of FIG. 1). Once received, the security alert may be investigated by, for example, security analysts and/or other resources associated with the SOC 122. In such examples, if the security alert is found to be applicable, the SOC 122 may take remedial and/or preventive actions to stop or contain possible attacks. In other examples, the security alert may trigger an immediate remediation effort, thereby bypassing investigation by the security analysts.

Figure 4:
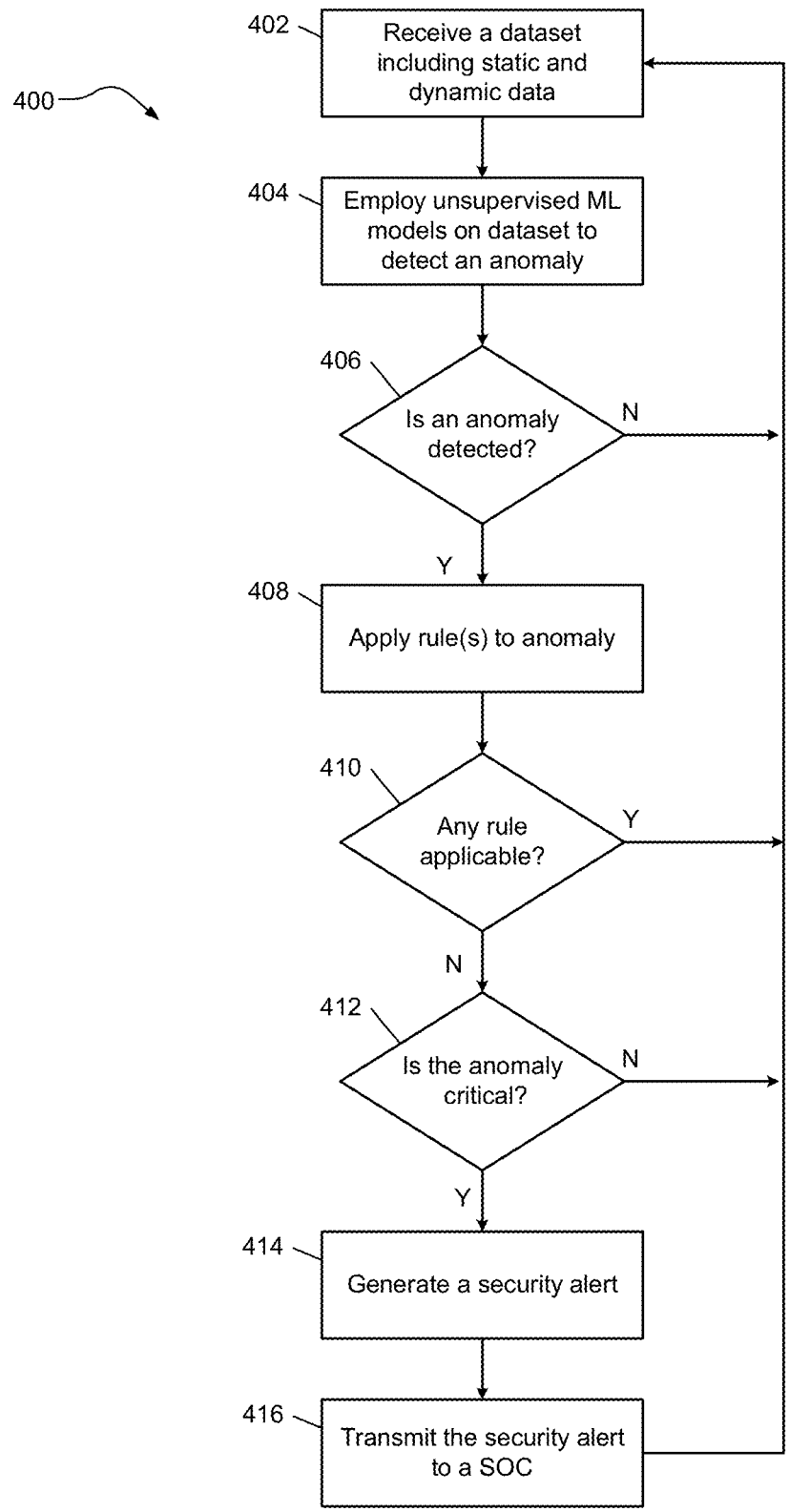
FIG. 4 illustrates another example anomaly detection method associated with users accessing a computing network according to at least one example embodiment.

FIG. 4 illustrates another example anomaly detection method 400 associated with users accessing a computing network according to at least one example embodiment. As shown, the method 400 of FIG. 4 includes some of the operations from the method 300 of FIG. 3. For example, the method 400 begins in operation 402 where a server may receive and/or obtain one or more datasets including static and dynamic data, as explained herein. Then, in operation 404 multiple unsupervised ML models may be employed to detect anomalies associated with the static and dynamic data. In operation 406, if an anomaly is detected, the method 400 proceeds to operation 408. Otherwise, the method 400 may return to operation 402.

In operation 408, a server (e.g., the rule server 118 of FIG. 1) may apply one or more defined rules to the detected anomaly to take into account real world considerations. If any of the rules are applicable to the anomaly in operation 410, the rule server 118 may deem the anomaly a false positive and prevent the anomaly from passing. In such examples, the method 400 may return to operation 402 as shown in FIG. 4. If no rule is applicable to the anomaly in operation 410, the method 400 proceeds to operation 412.

In operation 412, a server, such as the rule server 118 and/or the alert generation server 120 of FIG. 1, may determine whether the detected anomaly is critical, as explained herein. If the detected anomaly is not critical, the method 400 may return to operation 302 as shown in FIG. 4. If the detected anomaly is critical, the alert generation server 120 may generate a security alert in operation 414 and then transmit the security alert to a SOC (e.g., the SOC 122 of FIG. 1) in operation 416, as explained herein.

Figure 5:
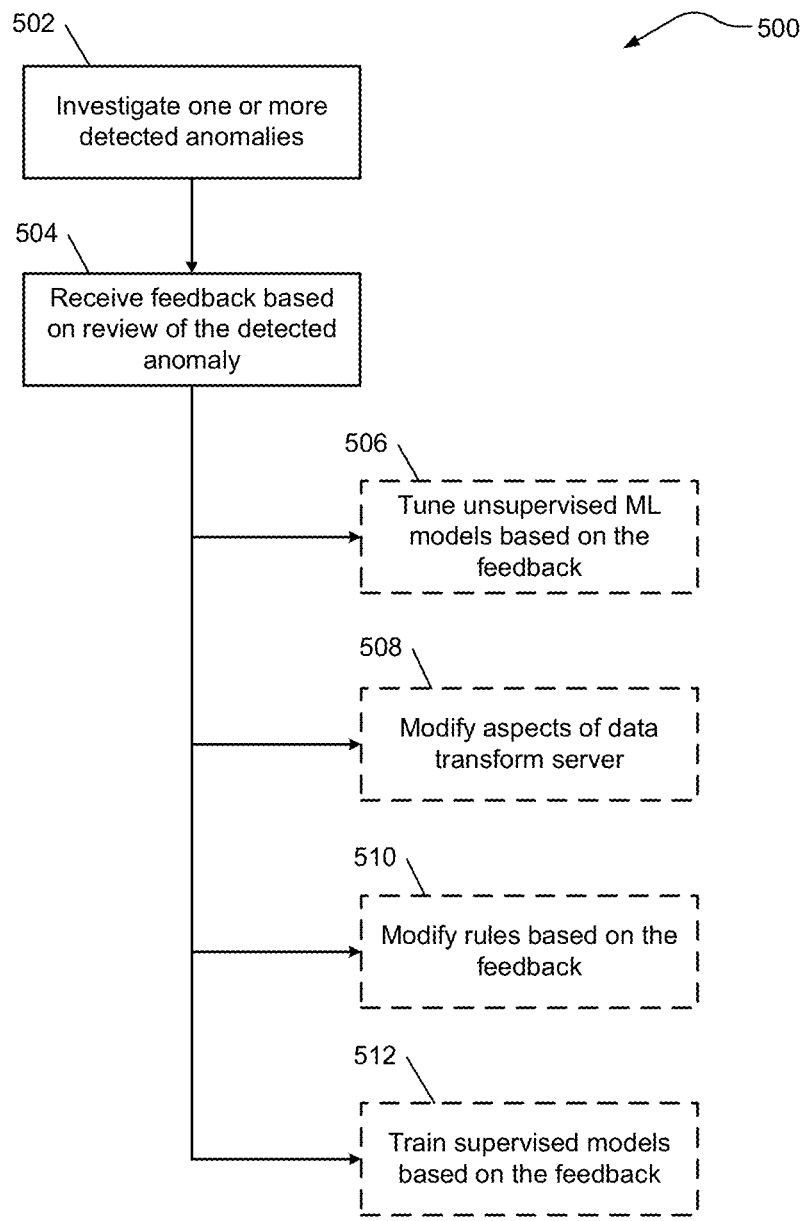
FIG. 5 illustrates an example feedback utilization method associated with users accessing a computing network according to at least one example embodiment.

FIG. 5 illustrates an example feedback utilization method 500 according to at least one example embodiment. As shown, the method 500 begins in operation 502 where one or more detected anomalies are investigated. For example, and as explained herein, a SOC may receive a security alert including information about a detected anomaly and a user associated with the detected anomaly (e.g., remote worker, office location, traveling, etc.). Once received by the SOC, the security alert may be investigated by, for example, security analysts and/or other resources associated with the SOC. Based on this review, the security analysts and/or other resources associated with the SOC (generally, the SOC) may create feedback related to the detected anomaly and other detected anomalies.

Next, in operation 504, one or more servers may receive the created feedback from the SOC. For example, with reference to FIG. 1, the data transform server 108, the ML server 116, the rule server 118, and/or the alert generation server 120 may receive such feedback. Then, in response to the feedback, upstream processes may be tweaked and improved for better model predictions in a recurrent manner, as explained herein.

For example, in operation 506, the models 110, 112, 114 of FIG. 1 may be optionally tuned, trained, etc. based on the received feedback. For instance, hyperparameters of the models 110, 112, 114, model families (e.g., in an ensemble), individual model weights in the ensemble, etc. may be modified based on the feedback to improve performance metrics. In operation 508, aspects (e.g., variables) associated with the data transform server 108 may be optionally modified based on the received feedback to adjust processing of the static and dynamic data. Additionally, in operation 510, one or more of the defined rules associated with the rule server 118 may be optionally modified based on the received feedback. Further, in operation 512, supervised models may be optionally trained based on the feedback. Then, the trained supervised models may be used in conjunction with or instead of initially employed unsupervised models, as explained herein.

Figure 6:
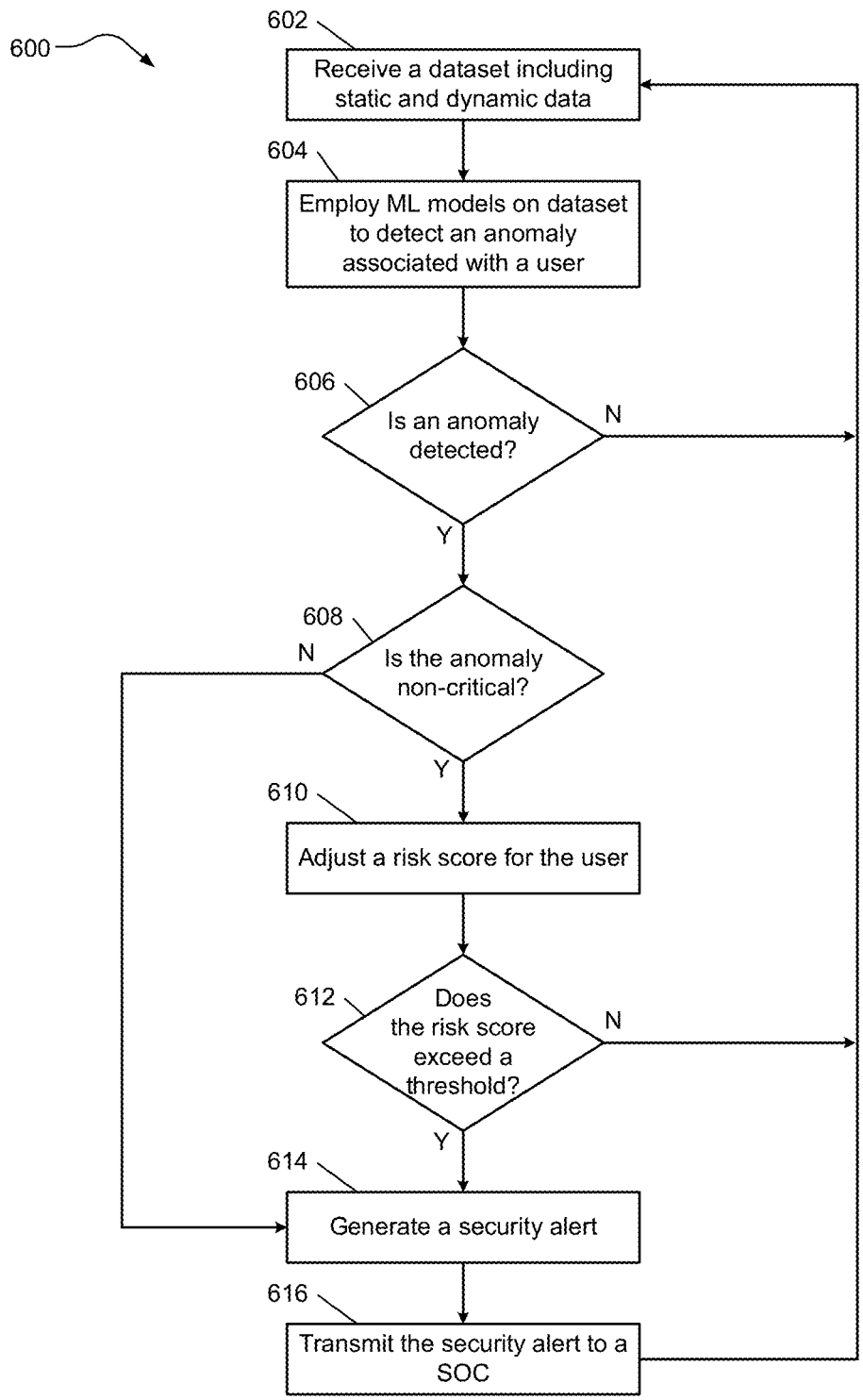
FIG. 6 illustrates an example risk score monitoring method associated with users accessing a computing network according to at least one example embodiment.

FIG. 6 illustrates an example risk score monitoring method 600 associated with users accessing a computing network according to at least one example embodiment. As shown, the method 600 of FIG. 6 includes some of the operations from the methods 300, 400 of FIGS. 3-4. For example, the method 600 begins in operation 602 where a server may receive and/or obtain one or more datasets including static and dynamic data, as explained herein. Then, in operation 604 multiple ML models (e.g., one or more unsupervised ML models and/or one or more supervised ML models) may be employed to detect anomalies associated with a user based on the static and dynamic data. In operation 606, if an anomaly is detected, the method 600 proceeds to operation 608. Otherwise, the method 600 may return to operation 602 as shown.

In operation 608, a server (e.g., the rule server 118) may determine whether a detected anomaly associated with the user is non-critical. For example, and as explained herein, the rule server 118 and/or the alert generation server 120 may classify the detected anomaly as non-critical if the anomaly has a low value (e.g., a low anomaly score). In either case, the rule server 118 and/or the alert generation server 120 may compare the value of the detected anomaly to a defined threshold, as explained herein. If the detected anomaly associated with the user is not considered non-critical in operation 608 (e.g., the detected anomaly is critical), the method may proceed to operation 614 as further explained below.

If, however, the detected anomaly associated with the user is considered non-critical in operation 608, the method may proceed to operation 610. In operation 610, a server (e.g., the risk index server 124 of FIG. 1) may adjust a risk score for the user based on the non-critical anomaly. For example, the risk index server 124 may increase the user's risk score in response to the detected anomaly being non-critical. In such examples, the risk index server 124 may receive information related to the non-critical anomaly and the user associated with the anomaly. In such examples, the non-critical anomaly may provide contextual information within a framework that monitors user activities over time.

Next, in operation 612, the risk index server 124 may determine whether the risk score (e.g., as adjusted in operation 610) exceeds a defined threshold. For instance, and as explained herein, the risk index server 124 may adjust the user's risk score based on multiple different factors, including different non-critical anomalies associated with the user as detected by the ML models, other security events associated with the user, etc. If the total risk score does not exceed the defined threshold in operation 612, the method 600 may return to operation 602 as shown. If, however, the total risk score exceeds the defined threshold in operation 612, the method 600 may proceed to operation 614.

In operation 614, a security alert may be generated. For example, if the detected anomaly associated with the user is not considered non-critical in operation 608 (e.g., the detected anomaly is critical), the alert generation server 120 of FIG. 1 may generate a security alert specific to the detected anomaly and/or the user who is associated with the anomaly, as explained herein. In other examples, if the total risk score exceeds the defined threshold in operation 612, the risk index server 124 may generate a security alert including information about security events, etc. leading to the generated alert, as explained herein. Then, in operation 616, the alert generation server 120 or the risk index server 124 may transmit the generated security alert to a SOC (e.g., the SOC 122 of FIG. 1). Security analysts and/or other resources associated with the SOC 122 may then investigate the alert and take remedial and/or preventive actions if necessary. The method 600 may return to operation 602 as shown.

While FIGS. 3-6 illustrate various methods related to anomaly detection for users accessing computing networks, SOC feedback utilization, and/or risk score monitoring and alerting, the example embodiments are not limited thereto. Additionally, other methods may be used and/or modifications to the methods of FIGS. 3, 4, 5 and/or 6 may be used to perform the anomaly detection for users accessing computing networks, SOC feedback utilization, and/or risk score monitoring and alerting.

Various example embodiments are directed towards an improved device, system, method and/or non-transitory computer readable medium for a machine learning based framework employing ML models that flag unusual activities and/or impossible scenarios related to users using remote and/or physical badge access of a computing network and/or resources associated with the computing network. In various embodiments, the models may be trained, tuned, and/or retrained according to what patterns (including new patterns) around remote and physical access look like. As such, performance of the models may be improved continuously to identify anomalous or unusual user access behaviors and patterns. In this manner, behaviors and patterns that represent a considerable departure from the norm may be preemptively recognized and investigated, thereby allowing possible attacks to be stopped or at least contained. As a result, the security posture against internal and external threats is enhanced and the computing network is more secure as compared to traditional reactive solutions which rely on hand-crafted rules based on known security scenarios.

This written description uses examples of the subject matter disclosed to enable any person skilled in the art to practice the same, including making and using any devices, systems, and/or non-transitory computer readable media, and/or performing any incorporated methods. The patentable scope of the subject matter is defined by the claims, and may include other examples that occur to those skilled in the art. Such other examples are intended to be within the scope of the claims.

What is claimed is:

1. A server for detecting anomalies associated with users accessing a network, the server comprising:
a memory storing computer readable instructions; and
processing circuitry configured to execute the computer readable instructions to cause the server to,
receive a dataset including static data and dynamic data, the static data including location data of resources associated with the network and user data, the dynamic data including user access events, detect, with a plurality of unsupervised machine learning (ML) models, an anomaly associated with a user accessing the network based on the static data and the dynamic data, the user having a risk score specific to that user, determine whether the detected anomaly is critical or not critical based on one or more first defined thresholds, in response to determining the detected anomaly is critical, generate and transmit a first security alert specific to the detected anomaly to a security operation center (SOC), in response to determining the detected anomaly is not critical, increase the risk score specific to the user and determine whether the increased risk score exceeds a second defined threshold, and in response to the increased risk score exceeding the second defined threshold, generate and transmit a second security alert specific to the user to the SOC.

2. The server of claim 1, wherein the processing circuitry is further configured to execute the computer readable instructions to cause the server to classify the detected anomaly as a false positive based on one or more defined rules.

3. The server of claim 2, wherein the processing circuitry is further configured to execute the computer readable instructions to cause the server to:
receive feedback from the SOC specific to the detected anomaly; and
modify at least one of the one or more defined rules based on the received feedback.

4. The server of claim 1, wherein the processing circuitry is further configured to execute the computer readable instructions to cause the server to:
receive feedback from the SOC specific to the detected anomaly; and
tune the plurality of unsupervised ML models based on the received feedback.

5. The server of claim 1, wherein:
the plurality of unsupervised ML models are trained unsupervised ML models; and
the processing circuitry is further configured to execute the computer readable instructions to cause the server to detect whether performance of the plurality of unsupervised ML models falls below a third defined threshold, and retrain the plurality of unsupervised ML models in response to the performance of the plurality of unsupervised ML models falling below the third defined threshold.

6. The server of claim 1, wherein the processing circuitry is further configured to execute the computer readable instructions to cause the server to:
receive feedback from the SOC specific to the detected anomaly;
train a plurality of supervised ML models based on the received feedback; and
detect, with the plurality of supervised ML models, an anomaly associated with a user accessing the network based on the static data and the dynamic data.

7. The server of claim 1, wherein the user access events includes at least one of a virtual private network login, a physical badge swipe, and a multifactor authentication process.

8. The server of claim 1, wherein the processing circuitry is further configured to execute the computer readable instructions to cause the server to:

receive feedback from the SOC specific to the detected anomaly;
train a plurality of supervised ML models based on the received feedback; and
detect, with the plurality of unsupervised ML models and the plurality of supervised ML models, an anomaly associated with a user accessing the network based on the static data and the dynamic data.

9. The server of claim 1, wherein the processing circuitry is further configured to execute the computer readable instructions to cause the server to:
receive feedback from the SOC specific to the detected anomaly;
train a plurality of supervised ML models based on the received feedback;
determine whether performance of the plurality of supervised ML models exceeds performance of the plurality of unsupervised ML models; and
in response to the performance of the plurality of supervised ML models exceeding the performance of the plurality of unsupervised ML models, detect, with the plurality of supervised ML models, an anomaly associated with a user accessing the network based on the static data and the dynamic data.

10. A method for detecting anomalies associated with users accessing a network, the method comprising:
receiving a dataset including static data and dynamic data, the static data including location data of resources associated with the network and user data, the dynamic data including user access events;
detecting, with a plurality of unsupervised machine learning (ML) models, a plurality of anomalies associated with a user accessing the network based on the static data and the dynamic data, the user having a risk score specific to that user;
determining whether each detected anomaly is critical or not critical based on one or more first defined thresholds;
in response to determining any of the detected anomalies are critical, generating and transmitting a first security alert specific to each of the detected anomalies determined to be critical to a security operation center (SOC);
increasing the risk score specific to the user for each of the detected anomalies determined to be not critical;
determining whether the increased risk score exceeds a second defined threshold; and
in response to the increased risk score exceeding a second defined threshold, generating and transmitting a second security alert specific to the user to the SOC.

11. The method of claim 10, further comprising classifying the detected anomaly as a false positive based on one or more defined rules.

12. The method of claim 11, further comprising:
receiving feedback from the SOC specific to the detected anomaly; and
modifying at least one of the one or more defined rules based on the received feedback.

13. The method of claim 10, further comprising:
receiving feedback from the SOC specific to the detected anomaly; and
tuning the plurality of unsupervised ML models based on the received feedback.

14. The method of claim 10, wherein:
the plurality of unsupervised ML models are trained unsupervised ML models, and the method further comprises detecting whether performance of the plurality of unsupervised ML models falls below a third defined threshold, and retraining the plurality of unsupervised ML models in response to the performance of the plurality of unsupervised ML models falling below the third defined threshold.

15. The method of claim 10, further comprising:
receiving feedback from the SOC specific to the detected anomaly;
training a plurality of supervised ML models based on the received feedback; and
detecting, with the plurality of supervised ML models, an anomaly associated with a user accessing the network based on the static data and the dynamic data.

16. A non-transitory computer readable medium storing computer readable instructions, which when executed by processing circuitry of a server, causes the server to:
receive a dataset including static data and dynamic data, the static data including location data of resources associated with a network and user data, the dynamic data including user login events;
detect, with a plurality of unsupervised machine learning (ML) models, an anomaly associated with a user accessing the network based on the static data and the dynamic data, the user having a risk score specific to that user;
determine whether the detected anomaly is critical or not critical based on one or more first defined thresholds;
in response to determining the detected anomaly is critical, generate and transmit a first security alert to a security operation center (SOC) specific to the detected anomaly; and
in response to determining the detected anomaly is not critical, increase the risk score specific to the user and determine whether the increased risk score exceeds a second defined threshold, and
in response to the risk score exceeding the second defined threshold, generate and transmit a second security alert specific to the user to the SOC.

17. The non-transitory computer readable medium of claim 16, wherein:
the plurality of unsupervised ML models are trained unsupervised ML models; and
the server is further caused to detect whether performance of the plurality of unsupervised ML models falls below a third defined threshold, and retrain the plurality of unsupervised ML models in response to the performance of the plurality of unsupervised ML models falling below the third defined threshold.

18. The non-transitory computer readable medium of claim 16, wherein the server is further caused to:
receive feedback from the SOC specific to the detected anomaly;
train a plurality of supervised ML models based on the received feedback; and
detect, with the plurality of supervised ML models, an anomaly associated with a user accessing the network based on the static data and the dynamic data.

19. The non-transitory computer readable medium of claim 16, wherein the server is further caused to:
receive feedback from the SOC specific to the detected anomaly;
train a plurality of supervised ML models based on the received feedback; and
detect, with the plurality of unsupervised ML models and the plurality of supervised ML models, an anomaly associated with a user accessing the network based on the static data and the dynamic data.

20. The non-transitory computer readable medium of claim 16, wherein the server is further caused to:
receive feedback from the SOC specific to the detected anomaly;
train a plurality of supervised ML models based on the received feedback;
determine whether performance of the plurality of supervised ML models exceeds performance of the plurality of unsupervised ML models; and
in response to the performance of the plurality of supervised ML models exceeding the performance of the plurality of unsupervised ML models, detect, with the plurality of supervised ML models, an anomaly associated with a user accessing the network based on the static data and the dynamic data.

* * * * *